United States Patent [19]

Coffman

[11] 4,229,405
[45] Oct. 21, 1980

[54] CONTINUOUS METHOD FOR FORMING THERMOPLASTIC SLAB STOCK

[75] Inventor: Paul M. Coffman, Houston, Tex.

[73] Assignee: Shell Oil Company, Houston, Tex.

[21] Appl. No.: 968,250

[22] Filed: Dec. 11, 1978

[51] Int. Cl.² .............................................. B29C 3/00
[52] U.S. Cl. .................................... 264/313; 264/325
[58] Field of Search .............................. 264/325, 313

[56] References Cited

U.S. PATENT DOCUMENTS

| | | | |
|---|---|---|---|
| 3,608,058 | 9/1971 | Coffman | 264/313 |
| 3,733,159 | 5/1973 | Coffman | 264/325 X |

OTHER PUBLICATIONS

Coffman, Paul M., "Thick Thermoplastic Slabs Via Rubber-Ring Forming", in *Plastics Engineering* Jun. 1978, pp. 37–39.

*Primary Examiner*—Philip Anderson

*Attorney, Agent, or Firm*—Martin S. Baer

[57] ABSTRACT

Void-free thermoplastic polymer slabs suitable for conversion into articles by shaping in the solid phase are produced by a method which comprises:

(a) placing deformable mold rings on a heat-transmitting endless belt at regular spacings, suitably by cementing the mold rings to the belt; and (b) forming polymer slabs by moving the belt at staged intervals to successively:
  (i) fill a mold ring from said melt dispensing means while the ring is resting on said belt;
  (ii) place said filled mold ring under compression between two heated platens at at least one station;
  (iii) subsequently placing said filled mold ring under compression between cooled platens at a multiplicity of cooling stations; and
  (iv) removing the cooled molded article, sufficiently solidified to maintain its shape, from the mold after it leaves the last of said cooling stations.

5 Claims, 4 Drawing Figures

CONTINUOUS METHOD FOR FORMING THERMOPLASTIC SLAB STOCK

BACKGROUND OF THE INVENTION

1. Field of the Invention

This invention relates to an improved method and apparatus for producing from thermoplastic polymers flat slabs or billets of substantial weight and thickness, free of internal voids and other defects, suitable for conversion to useful articles without remelting.

2. Description of the Prior Art

In recent years a significant industry has developed for the production of thick-sectioned slab stock for use in fabricated structures like tanks, machinery bases and machined parts such as gears, wheels, and bearings. Another factor generating increasing interest in these slabs is the development of "solid phase forming" processes. These techniques involve the shaping of billets, cut from sheet or slab stock. At a temperature just below the crystal melting point the billets can be forged, stamped, or deep drawn into a wide variety of parts. The molding or thick-sectioned thermoplastic slabs or parts, e.g., about 0.5-5 cm (or about 0.25 in. to 2 in.) thick, is inherently difficult and time consuming. The time required for solidification is long because of the low thermal conductivity of all plastics. This time increases approximately as the square of the thickness. The second factor of importance is the large volumetric shrinkage of thermoplastics when cooling from a melt to a room temperature solid. This is especially significant in the case of crystalline polymers like polypropylene and high density polyethylene (HDPE) which shrink about 15 and 25 volume percent, respectively, during the cooling cycle. If one attempts to injection mold thick parts, this volume change shows up as shrinkage away from the mold surfaces and/or voids within the part. In addition to the creation of sinks and voids, the shrinkage away from the mold further reduces the rate of cooling and extends the cycle.

The methods routinely used to produce thick plastic slabs are sheet extrusion and compression molding. Sheet extrusion of thick stock is often slow and the product requires stress relieving for many fabricated applications. Compression molding usually involves loading a large mold with pellets, melting the pellets with heated platens, then cooling the platens and solidifying the product. This compression molding is usually done under high pressures to minimize void formation and sinking. Pressures of about 35-70 bars (about 500-1000 psi) are common, requiring heavy and expensive press equipment.

The prior conventional procedure of pressing pellets against heated platens to prepare a thick slab is time-consuming and inefficient. In searching for a more economical method, I first concluded that the melting function should be carried out in an extruder. Consequently, I devised the method described in my U.S. Pat. Nos. 3,608,058 and 3,733,159, which comprises extruding a thick "blob" of melt into a mold in which the side-wall defining member is made a deformable material, such as a rubber ring, and the billet is formed by compressing the ring mold between cooled flat platens.

SUMMARY OF THE INVENTION

It is an object of this invention to provide an economical process for producing thick slabs of thermoplastics, suitable, for example, as billets for forging and other solid phase forming processes for the manufacture of heavy-sectioned and deep drawn polypropylene parts. Such slabs, of about 0.5-5 cm, and more usually 1-4 cm (or about 0.5 to 1.5 in.) thickness, may subsequently be die cut into blanks of various sizes to be forged into parts such as gears or deep drawn into containers such as 5 gallon pails.

In developing the prior inventions of U.S. Pat. Nos. 3,608,058 and 3,733,159, I observed that serious problems were encountered when forming thick slabs between matched metal dies where the upper die compresses the polymer melt by sliding down in a rigid ring defining the mold perimeter. Very close clearances are required to minimize severe flashing between the punch and die. The perimeter cooling effect of the metal die causes freezeup of a load bearing column around the perimeter. As the melt shrinks, this column must be crushed by the use of high press tonnage otherwise sinks and voids will be created. Crushing of this column not only requires high pressures but also creates stresses in the slab. The tool flashing which occurs while the plastic is molten ultimately freezes between punch and die to create a severe wedging action which requires added press force. Although heating will prevent the load bearing column buildup around the perimeter of the tooling it greatly complicates tooling and induces more flashing between the mated tools.

I therefore decided initially that a desirable process for production of thick thermoplastic polymer slabs should satisfy the following criteria:

1. Minimum heat transfer on the perimeter to prevent the development of a load-bearing column.
2. Easy sealing between male and female die to prevent flashing.
3. Provision for the punch to move as shrinkage takes place.
4. Provision for air escape during initial compression of the melt.

These requirements are met by the use of deformable tooling in accordance with the invention of U.S. Pat. Nos. 3,608,058 and 3,733,159.

However, the long time required to cool the thick plastic billet in the mold makes the method of said patents relatively expensive. This deficiency is overcome by the present invention, which meets a fifth criterion, namely:

5. Fast changeover from heating to cooling of platens.

According to this invention, I produce thermoplastic polymer slabs in a continuous system comprising:
   (a) a polymer melt dispensing means;
   (b) multiple deformable mold rings;
   (c) a heat-transmitting movable endless belt;
   (d) multiple heat exchange and compression stations, each comprising
       (i) a lower platen adapted to support said mold ring and its contents, resting on said belt, and
       (ii) an upper platen adapted to place said mold ring and its contents under mechanical pressure, said platens being equipped to supply heat or to remove heat from the polymer in the mold.

The method of this invention comprises:
   (a) placing deformable mold rings on a heat-transmitting endless belt at regular spacings, suitably by cementing the mold rings to the belt; and
   (b) forming polymer slabs by moving the belt at staged intervals to successively:

(i) fill a mold ring from said melt dispensing means while the ring is resting on said belt;
(ii) place said filled mold ring under compression between two heated platens at at least one station;
(iii) subsequently placing said filled mold ring under compression between cooled platens at a multiplicity of cooling stations; and
(iv) removing the cooled molded article, sufficiently solidified to maintain its shape, from the mold after it leaves the last of said cooling stations.

DESCRIPTION OF THE PREFERRED EMBODIMENTS

Figure 1:
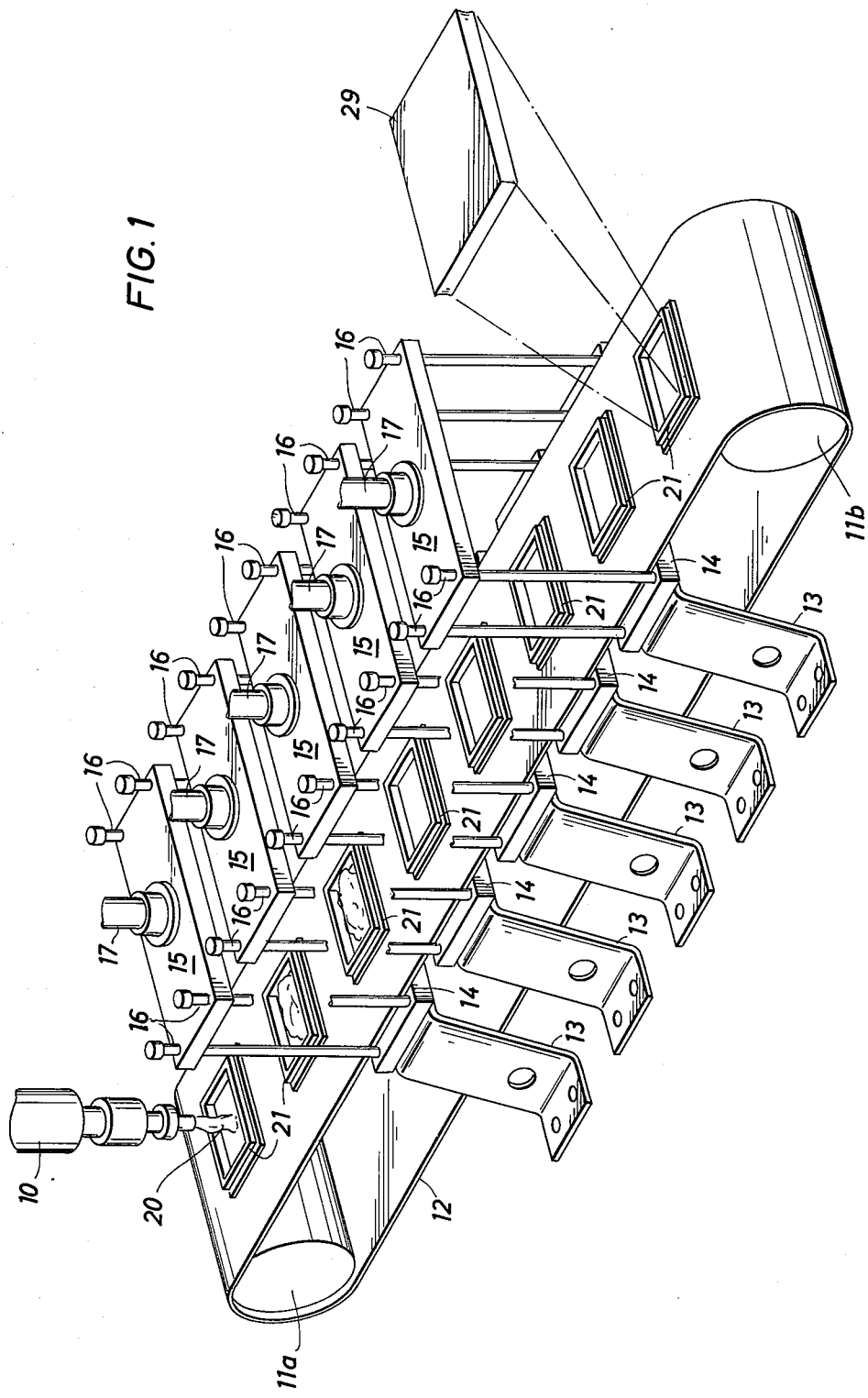
FIG. 1 is an isometric view of the apparatus of this invention.

The preferred embodiment of the invention is illustrated in the drawing. The apparatus, as illustrated in FIG. 1, comprises the following parts: An extruder 10 is adapted to dispense polymer-melt into an open mold 21 resting on endless belt 12. The belt is adapted to be moved in stepwise fashion by cylinders 11a and 11a, actuated by primary moving means not shown, through a series of compression and heat exchange stations, each of which consist of a mount 13 supporting a fixed lower platen 14 and a movable upper platen 15, both having rigid planar surfaces. The upper platen is mounted on four guide posts 16 to insure that the platens are parallel and is connected by shaft 17 to a press, not shown, which is capable of controlling the movement of the upper platen and exerting mechanical force when it is in contact with the mold. The platens are provided with heat exchange means, not shown, e.g., internal conduits for circulation of heated or cooled liquid, as required.

In the preferred embodiment, extruder 10 is a conventional screw-type extruder, mounted on rails to permit it to distribute polymer melt to conform approximately to the shape of mold 21. The endless belt is adapted to transmit heat and has a smooth surface. It may be made of stainless steel, suitably provided with a thin coating of polytetrafluoroethylene, e.g., an about 0.15 mm (about 6 mil) thick film of reinforced tetrafluoroethylene polymer or polyimide. The mold ring is a deformable mold ring of the heat insulating type described in my U.S. Pat. Nos. 3,608,058 and 3,733,159. The mold ring is essentially rigid when not subjected to force but is capable of flow when under molding pressure. A preferred embodiment is that illustrated in section in FIGS. 2, 3 and 4 of the drawing, which show mold ring 21 having a grooved upper surface for venting of air, a concave inner wall surface, an internal void 22 and a metal reinforcing ring 23 which fits into a slot which is a continuation of said internal void and which is provided with a supporting projection 24. Platens 14 and 15 are provided with heat exchange means not shown and are thereby adapted to add heat to or remove heat from the contents of the molds. The lower surface of the upper platen is preferably coated with polytetrafluoroethylene polymer or a similar material which will prevent adhesion of the polymer melt to the platen. In the preferred embodiment, mold rings 21 are fixedly attached to belt 12, e.g., by being cemented to the belt at regularly spaced intervals.

The method of producing polymer slabs according to this invention consists of extruding a "blob" of polymer melt from extruder 10 into a mold 21, which is resting on the endless belt under the extruder. Preferably the extruder, mounted on rails, is moved to deposit a relatively evenly shaped, flat blob of polymer, conforming approximately to the shape of the mold. The amount of polymer required to fill a given mold is predetermined and the extruder is programmed to deposit such a predetermined amount. The melt may be cut with an air knife or other suitable means. After an appropriate amount of melt has been deposited in mold 21, the belt is indexed forward to move a new mold frame into filling position and the filling procedure is repeated. As illustrated in FIG. 1, a second indexing move places the first filled mold into position in the first compression and heat exchange station where it rests on lower platen 14. Upper platen 15 is then lowered to compress the polymer mass in the mold while air escapes through the air vents in the upper surface of the mold frame. After a predetermined length of time the upper platen is indexed to move the first-filled mold into the next compression and heat exchange station. The index moves are repeated continuously. When the mold leaves the last station, the polymer slab has been cooled sufficiently to be completely or at least substantially solidified, which permits it to maintain its shape on handling outside the mold. As the belt turns downward over cylinder 11b, the polymer slab, shown enlarged as slab 29, is forced out of the mold and removed, for example by a conveyor not shown.

In an illustrative embodiment, it is desired to produce 2.5 cm (about 1 in.) thick 1 m×3 m (3.28 ft.×3.28 ft.) polypropylene slabs; these will weight approximately 21 kg (about 47 pounds) each. An 11.43 cm (about 4½ inch) extruder, mounted on rails perpendicular to the endless belt, extrudes a ribbon of polypropylene at 200° C. (about 400° F.) temperature, which is laid down as a strip of melt about 5 cm (about 2 inches) thick and 70 cm (about 2.3 feet) square within the confines of the mold. The melt is cut from the die on a timed basis. The belt indexes about 1.2 m (about 4 feet) forward, moving a second mold into filling position. On the next indexing move, the first-filled mold is moved to the first heat exchange and compression station, which is a hot press whose platens are maintained at a temperature of about 180° C. As the upper platen is lowered, the melt is leveled and vented. On a 3 minute cycle, the mold progresses to the first cooling and compression station, where it is again mechanically compressed and held for 3 minutes as it cools. As shown in the drawing, it progresses through three more cold presses, giving a total of 12 minutes of cooling. The temperature of the cooling medium in the platens of the cooling stations is initially about 20° C. in all stations. As the belt moves forward it turns down over drum 11b. This breaks the vacuum between the belt and the slab and permits easy ejection of the slab.

In this system, cooling is the basic rate limitation. Output of this system can be increased by adding more cold pressing stations, provided the extruder has sufficient melt capacity.

Items of equipment which can be readily supplied by the skilled machine designer are not shown in the drawing. These include details of the design and mounting of the melt extruder and means for controlling the amount of melt deposited in a mold ring; the design and type of mechanical presses; timing mechanism, prime movers and driving mechanisms, and supports for the endless belts; apparatus for removing the formed slabs; and heat exchange means for platens 14 and 15.

While the above described embodiment is preferred, it will be possible to provide many modifications within the scope of this invention.

The temperature of the extruded polymer and the temperatures maintained at the heating and cooling stations may be varied over a wide range. The extrudate is preferably at from 10° to 50° C. above the polymer melting point. The platens at the first heating and compression station are preferably held at 10° to 50° C. above the polymer melting point. The platens at the cooling stations may be held at the temperature of available cooling water, e.g., between 5° and 35° C.

Figure 2:
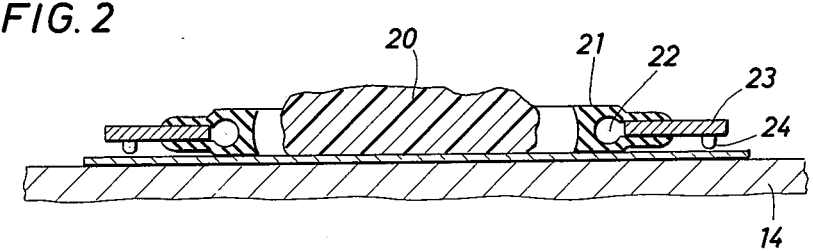
FIGS. 2, 3 and 4 are diagramatic views in vertical section of a mold at three stages of processing, namely: with the polymer melt in position for molding; with the melt under molding pressure; and on completion of the molding cycle.
Figure 3:
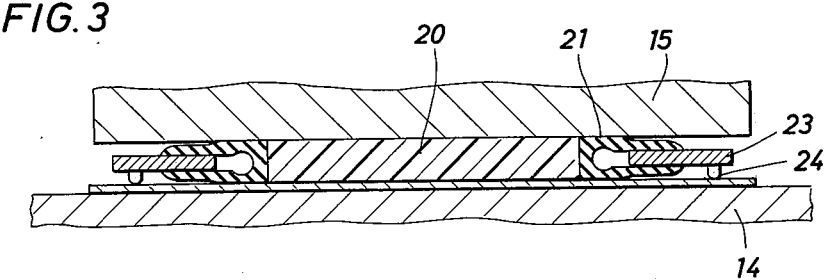

In the first compression station, the upper platen is moved down relatively slowly, e.g., over a period of 0–15 seconds, to permit the polymer to be flattened and air to be vented. The stage prior to descent of the upper platen is illustrated in FIG. 2 and the appearance following completion of descent in FIG. 3. In the compression and cooling stages, descent of the upper platen may be relatively fast. In each stage, the pressure applied is desirably at least about 3.5 Kg/cm$^2$ (about 50 psi).

Figure 4:
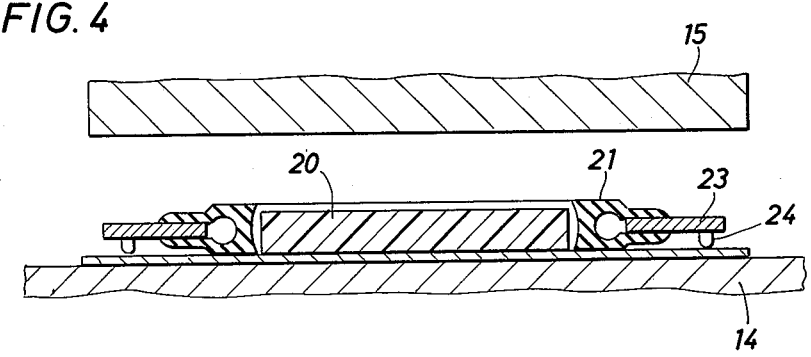

FIG. 4 illustrates the appearance of the mold and slab on completion of the last cooling stage.

The number of cooling station and the timing of the belt movement are adjusted to make sure that the slab being ejected has been sufficiently solidified to retain its shape without further need for compression.

While the molds are preferably fixedly mounted on the belt, they may be placed loosely on the belt at fixed intervals and removed with the cool slab.

The shape of the mold frame can be adapted to the size and configuration of the slab needed for further processing, and different types of deformable mold ring may be employed, as described in my patents cited above.

What I claim is:

1. A continuous method for forming thermoplastic polymer slabs which comprises:
   providing a multiplicity of deformable heat insulating mold rings; a polymer melt dispensing means; a continuous heat-transmitting movable belt; multiple compression and heat exchange stations, each comprising a lower platen adapted to support a mold ring resting on said belt and an upper platen adapted to place said mold ring and its contents under mechanical pressure; and
   forming said polymer slabs by moving said belt at staged intervals to successively:
   a. fill a mold ring from said melt dispensing means while the ring is resting on said belt;
   b. place said filled mold ring under compression between heated platens at at least one station;
   c. subsequently placing said filled mold ring under compression between cooled platens at a multiplicity of cooling stations; and
   d. removing the cooled molded article, sufficiently solidified to maintain its shape, from the mold after it leaves the last of said cooling stations.

2. A continuous method for forming void free thermoplastic polymer slabs which comprises:
   a. at a first station placing molten polymer composition, sufficient to provide a formed article of predetermined dimensions, into an open mold cavity defined by a portion of a smooth, continuous belt capable of transmitting heat and by a deformable heat-insulating body which rests on said belt and which defines the perimeter of said article, is essentially rigid when not subjected to force, is capable of flow under molding pressure and is provided with means for venting trapped air;
   b. advancing said belt in stepwise fashion to successively move empty molds first to said first station for filling with polymer and thereafter to a multiplicity of heat exchange and compression stations;
   c. in the first of said heat exchange and compression stations supporting said mold on a lower rigid planar surface at a temperature within 50° C. above the melting point of said polymer, and gradually forcing into contact with said polymer and said deformable body an upper rigid planar surface, heated to a temperature in said range and substantially parallel to said lower surface, while permitting trapped air to escape from the mold;
   d. maintaining sufficient force on said rigid planar surfaces to maintain unsolidified polymer in said mold cavity under compression and thereafter lifting said upper surface;
   e. in subsequent stations, supporting said belt on a lower rigid planar surface maintained at a temperature substantially below the freezing point of said polymer and maintained under compression by an upper rigid planar surface which is also maintained at temperature substantially below the freezing point of said polymer;
   f. cooling said molten polymer through at least one of said rigid planar surfaces while under molding pressure for a time sufficient to result in complete solidification of the polymer, a portion adjacent said heat-insulating body remaining relatively soft and deformable so long as any substantial portion of the total polymer mass is still molten; and
   g. removing the cooled molded article, sufficiently solidified to maintain its shape, from the mold after it leaves the last of said cooling stations.

3. The method according to claim 2 wherein said deformable heat-insulating bodies are fixed to said supporting belt.

4. The method according to claim 2 wherein said polymer is a crystallizable polyolefin and the thickness of said article is in the range of about one-half to 5 centimeters.

5. The method according to claim 2 wherein said polymer is polypropylene and said molten polymer is at a temperature in the range from about 180° to 250° C., said heated surfaces are maintained at about 180° C. and said cooled surfaces are maintained at about 20° C.

* * * * *